US011330010B2

(12) United States Patent
Li

(10) Patent No.: US 11,330,010 B2
(45) Date of Patent: May 10, 2022

(54) DETECTING MALICIOUS WEB PAGES BY ANALYZING ELEMENTS OF HYPERTEXT MARKUP LANGUAGE (HTML) FILES

(71) Applicant: Fortinet, Inc., Sunnyvale, CA (US)

(72) Inventor: Haitao Li, Coquitlam (CA)

(73) Assignee: Fortinet, Inc., Sunnyvale, CA (US)

(*) Notice: Subject to any disclaimer, the term of this patent is extended or adjusted under 35 U.S.C. 154(b) by 322 days.

(21) Appl. No.: 16/582,990

(22) Filed: Sep. 25, 2019

(65) Prior Publication Data

US 2021/0092130 A1 Mar. 25, 2021

(51) Int. Cl.
*H04L 29/06* (2006.01)
*G06F 16/955* (2019.01)
*G06F 21/56* (2013.01)
*G06F 11/32* (2006.01)

(52) U.S. Cl.
CPC .......... *H04L 63/145* (2013.01); *G06F 11/327* (2013.01); *G06F 16/955* (2019.01); *G06F 21/563* (2013.01)

(58) Field of Classification Search
CPC .... H04L 63/145; G06F 16/955; G06F 11/327; G06F 21/563; G06F 21/565; G06F 21/566
See application file for complete search history.

(56) References Cited

U.S. PATENT DOCUMENTS

| 8,595,803 | B2* | 11/2013 | Zaitsev | H04L 67/02 726/4 |
| 8,856,937 | B1* | 10/2014 | Wuest | H04L 63/1483 726/26 |
| 9,047,259 | B1* | 6/2015 | Ho | G06F 40/134 |
| 9,065,850 | B1* | 6/2015 | Sobrier | H04L 63/1483 |
| 9,135,445 | B2* | 9/2015 | Kay | G06F 21/602 |
| 2011/0219448 | A1* | 9/2011 | Sreedharan | G06F 21/566 726/23 |
| 2011/0289582 | A1* | 11/2011 | Kejriwal | G06F 21/566 726/22 |
| 2017/0374094 | A1* | 12/2017 | Agarmore | H04W 12/35 |

* cited by examiner

*Primary Examiner* — Hosuk Song
(74) *Attorney, Agent, or Firm* — Law Office of Dorian Cartwright; Dorian Cartwright

(57) ABSTRACT

Systems and methods are described for detecting compromised web pages and domains by analyzing of elements of hypertext markup language (HTML) files of a domain. In one embodiment, a security service receives a request including a potentially malicious uniform resource locator (URL) and retrieves a first HTML file to which the potentially malicious URL points and a second HTML file to which a host URL corresponding to the potentially malicious URL points. The security service determines whether the potentially malicious URL is a malicious URL by comparing features of the first HTML file to corresponding features of the second HTML file and when a similarity value resulting from the comparing is less than a threshold, then the security service concludes that the first HTML file was created by a malicious actor and responds to the request with an indication that the potentially malicious URL is a malicious URL.

18 Claims, 9 Drawing Sheets

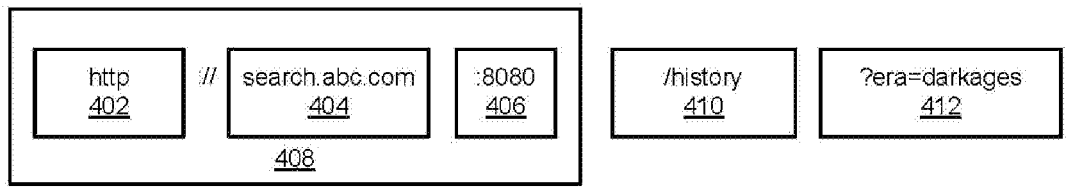
FIG. 4A
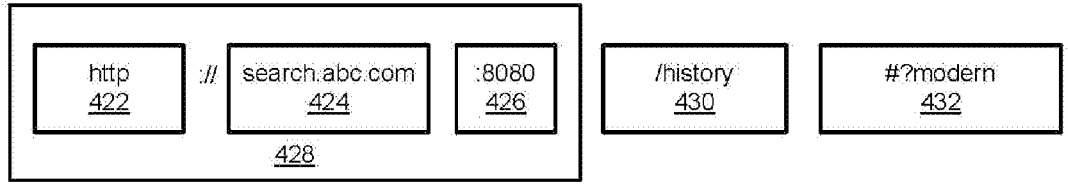
FIG. 4B
```
<HTML>
<Head>
<Title>Hello world</Title>
.
.
..
</Head>
</Body>
</H1>hello world</H1>
.
.
.
</Body>
</HTML>
```
FIG. 4C

460 ⟶

```
<html>
  <head>
    <title>HTML Example</title>

<meta name = "specification" content = "C, C++, Java, PHP, Perl, Python">

<meta name = "description" content = "Hard Learning Point">

<meta http-equiv = "expires" content = "Wed, 31 July 2019 14:25:27 GMT">

<meta name = "Artificial Intelligence" content = "noindex, nofollow">

</head>
  <body>
    <p>Hello, World!</p>
    ..
    ..
    ..
  </body>
</html>
```

```
<html>
  <head>
    <title>HTML Example</title>

<meta name = "specification" content = "C, C++, Java, PHP, Perl, Python">

<meta name = "description" content = "Hard Learning Point">

<meta http-equiv = "expires" content = "Wed, 31 July 2019 14:25:27 GMT">

<meta http-equiv = "Deep Learning" content = "text/html; charset = UTF-8">

<meta http-equiv = "fresh" content = "30">

<meta http-equiv = "Dead" content = "Wed, 21 June 2006 14:25:27 GMT">

<meta name = "Artificial Intelligence" content = "noindex, nofollow">

</head>
  <body>
    <p>Hello, World!</p>
    ..
    ..
  </body>
</html>
```

```
<html>
  <head>
    <title>HTML Meta Tag Example</title>

<meta name = "Specification" content = "C, C++, Java, PHP, Perl, Python">

<meta name = "description" content = "Simply Easy Learning by Tutorials Point">

<base href = "https://www.boom-example.com/" />

<link rel = "stylesheet" type = "text/css" href = "/css/style.css">
  </head>
  <body>
    <p>Hello, World!</p>
..
..
..
  </body>

</html>
```

FIG. 4F

DETECTING MALICIOUS WEB PAGES BY ANALYZING ELEMENTS OF HYPERTEXT MARKUP LANGUAGE (HTML) FILES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to cybersecurity. In particular, embodiments of the present invention generally relate to detection of hacked websites or websites created by malicious actors (hackers) based on malicious uniform resource locators (URLs) by analyzing elements of hypertext markup language (HTML) files.

Description of the Related Art

Malicious web pages may host unsolicited content, like spam, and represent a serious threat to cybersecurity from which attacks (e.g., phishing, drive-by-exploits, etc.) may be launched. For example, compromised or malicious web pages can cause automatic download of unsolicited content, which could potentially jeopardize the security of vulnerable computers. The number of new malicious URLs that are created every day is sizeable. Once these malicious URLs are detected, they are typically added to blacklists to protect users from accessing known malicious web pages; however, there are a number of disadvantages to such an approach including false positives, false negatives and the reactive nature of such blacklists.

SUMMARY

Systems and methods are described for detecting compromised web pages and domains by analyzing of elements of hypertext markup language (HTML) files of a domain. In one embodiment, a security service running on one or more servers receives a request including a potentially malicious uniform resource locator (URL) pointing to a web page within a website domain of an enterprise from an endpoint security solution running on an endpoint device. In response to receipt of the request, the security service retrieves, a first HTML file and a second HTML file from the website domain of the enterprise. The first HTML file can be the file to which the potentially malicious URL points and the second HTLM file can be the file to which a host URL corresponding to the potentially malicious URL points. The security service determines whether the potentially malicious URL is a malicious URL by comparing features of the first HTML file to corresponding features of the second HTML file such that when a similarity value resulting from the comparing is less than a predefined or configurable threshold, then the security service concludes that the first HTML file was created by a malicious actor and responds to the request with an indication that the potentially malicious URL is a malicious URL.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4A illustrates an exemplary representation of a typical URL in accordance with an embodiment of the present disclosure.

FIG. 4B illustrates an exemplary representation of another URL in accordance with an embodiment of the present disclosure.

FIG. 4C illustrates an exemplary representation of a typical HTML file in accordance with an embodiment of the present disclosure.

FIG. 4D illustrates an exemplary representation of an HTML file of a homepage of a website in accordance with an embodiment of the present invention.

FIG. 4E illustrates an exemplary representation of an HTML file of an original webpage of a website in accordance with an embodiment of the present invention.

FIG. 4F illustrates an exemplary representation of an HTML file of a malicious webpage added by a hacker of a website in accordance with an embodiment of the present invention.

DETAILED DESCRIPTION

Figure 1:
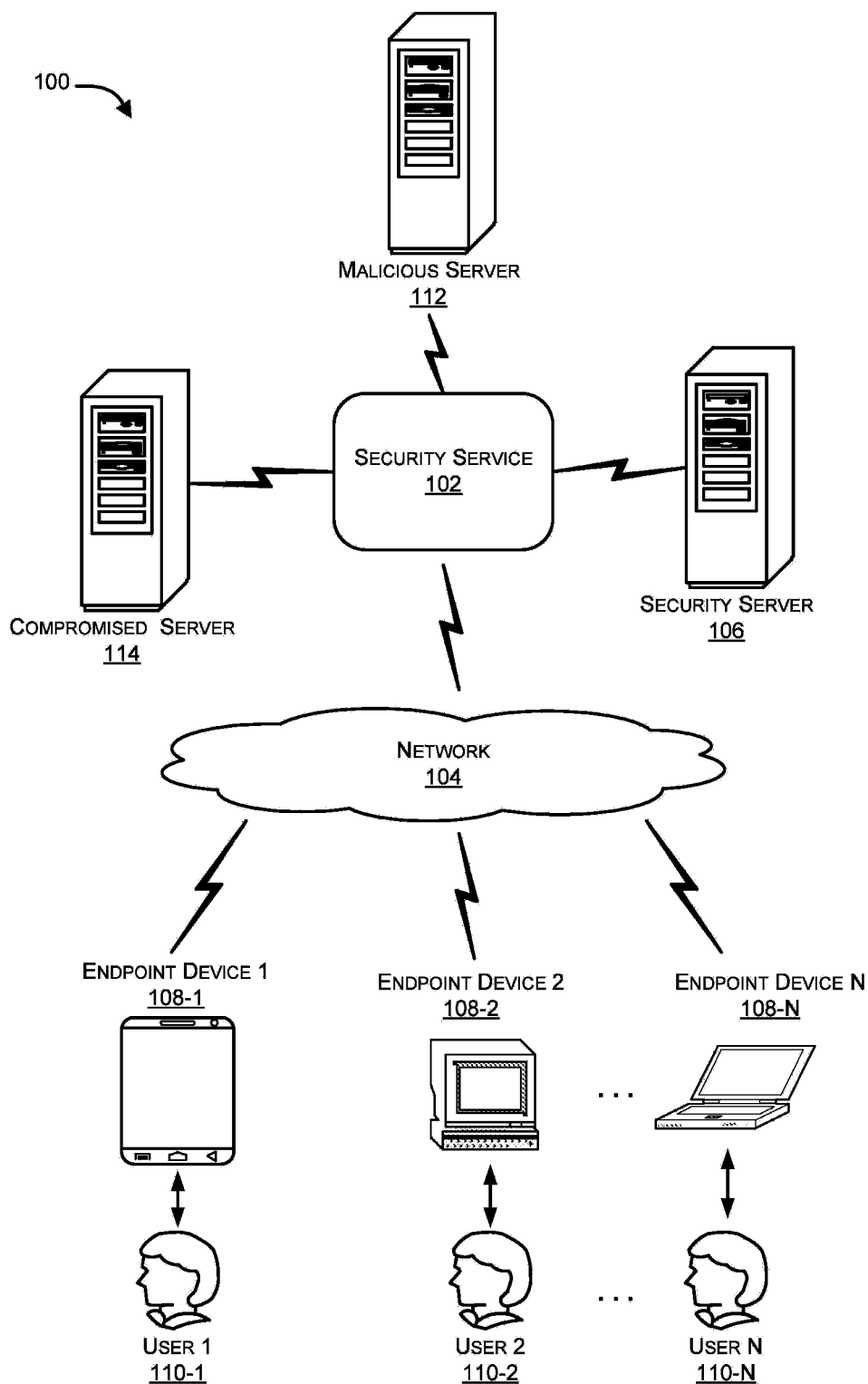
FIG. 1 illustrates a simplified network architecture in which aspects of the present invention can be implemented in accordance with an embodiment of the present invention.

Systems and methods are described for detecting malicious web pages and domains by analyzing of elements of hypertext markup language (HTML) files. Malicious URLs can be classified into two categories. The first category includes malicious URLs associated with hosts that are operated/maintained by malicious actors (hackers) themselves. The second category includes malicious URLs associated with hosts of hacked websites. In the second category, the owner/operator of the website may or may not be aware of the fact that a malicious actor is hosting malicious content within their domain. It is helpful to automatically distinguish between the two categories of malicious URLs. In particular, with hacked URLs, a network security vendor can alert the owners of the websites and provide security services to them. Quintessential indicators that a website or a server has been compromised include a manipulated front-page; the existence of malicious code in hypertext markup language (HTML) source; embedded elements in the website's content; or an unusual increase or decrease in traffic.

In general, embodiments of the present invention are influenced by the fact that original web pages of a normal website usually share some common features, while web pages intentionally added by a malicious actor (hacker) have features that are significantly different from the common features of the original web pages. According to one embodiment, a method for detecting malicious URLs includes: calculating the difference between features of a potential malicious URL and its host URL (the URL without path and query parts). If the difference exceeds a predetermined or configurable threshold, the potential malicious URL may be confirmed as being hosted in a hacked website with high probability. Compared with conventional approaches, this solution is easy to deploy with little domain knowledge and is widely applicable to a variety of malicious URLs.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrase "URL" is an abbreviation of Uniform Resource Locator, which is global address of documents and other resources on the World Wide Web. A URL is generally made up of four components written in a specific format i.e. "scheme://host:port/path?query". Scheme indicates what protocol to use, host specifies IP address or domain name where the resource is located, path identifies specific resource in the host that client wants to access and query is a string that follows the path component, and provides information that the resource can use for specific purpose. In the specific format of the URL, the scheme and the host are separated by a colon and two forward slashes, the host and the port are separated by a colon, the port and the path are separated by a forward slash and the path and the query are separated by a question mark.

The phrase "host URL" generally refers to a part of the URL that is extracted in the format "scheme://host:port". Therefore, given a potential malicious URL in the format "scheme://host:port/path?query", the host URL can be obtained by excluding the path and query parts (portions) of the potential malicious URL.

The phrase "HTML head element" generally refers to the content between the <head> and </head> tags of an HTML file.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

In one embodiment, a security service running on one or more servers receives a request including a potentially malicious URL pointing to a web page within a web site domain of an enterprise from an endpoint security solution running on an endpoint device. In response to receipt of the request, the security service retrieves, a first HTML file and a second HTML file from the web site domain of the enterprise. The first HTML file can be the file to which the potentially malicious URL points and the second HTLM file can be the file to which a host URL corresponding to the potentially malicious URL points. The security service determines whether the potentially malicious URL is a malicious URL by comparing features of the first HTML file to corresponding features of the second HTML file such that when a similarity value resulting from the comparing meets a predetermined condition (e.g., is less than or greater than a predefined or configurable threshold depending upon the nature of the similarity value), then the security service concludes that the first HTML file was created by a malicious actor and therefore responds to the request with an indication that the potentially malicious URL is a malicious URL. In one embodiment, the higher the similarity value, the more similar the HTML files are. In alternative embodiments, in which a distance measure is used, the higher the similarity value is, the less similar (the more distant) the HTML files are.

FIG. 1 illustrates a simplified network architecture 100 in which aspects of the present invention can be implemented in accordance with an embodiment of the present invention. In network architecture 100, a security service 102 can be implemented within a security server 106. Further, users 110-1, 110-2 . . . 110-N (which may be collectively referred to as users 110 and individually referred to as user 110, hereinafter) can interact with security service 102 using their respective endpoint devices 108-1, 108-2 . . . 108-N (which may be collectively referred to as endpoint devices 108 and individually referred to as endpoint device 108, hereinafter) using a network 104. Endpoint devices 110 may include, but are not limited to, personal computers, smart devices, web-enabled devices, hand-held devices, laptops, mobile phones and the like, to enable interaction with network 104.

Those skilled in the art will appreciate that, network 104 can be wireless network, wired network or a combination thereof that can be implemented as one of the different types of networks, such as Intranet, Local Area Network (LAN), Wide Area Network (WAN), Internet, and the like. Further, network 104 can either be dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Alternately, security service 102 can be implemented as a cloud-based service that can be provisioned and accessed through a cloud computing provider, exterior to the network 104 or any suitable network or computing device operatively coupled with network 104.

Those skilled in the art will appreciate that security service 102 of the present invention is capable of detecting two categories of malicious URLs, i.e. (i) URLs pointing to content provided by a malicious server 112 that is operated/controlled by a malicious actor and hosts malicious content and (ii) a compromised server 114 that is operated/controlled by a non-malicious entity, but, which has been compromised and unbeknownst to the owner/operator hosts malicious content.

According to an aspect, security service 102 analyses a potential malicious URL provided by endpoint device 108 by receiving a request including the potentially malicious URL that points to a web page within a website domain of an enterprise from an endpoint security solution running on endpoint device 108. In response to receipt of the request, security service 102 can retrieve a first HTML file and a second HTML file from the website domain of the enterprise. The first HTML file may represent the file to which the potentially malicious URL points and the second HTML file may represent the file to which a host URL (e.g. URL without path and query parts) corresponding to the potentially malicious URL points.

In an embodiment, the security service can compare features of the first HTML file to corresponding features of the second HTML file to determine whether the potentially malicious URL is a malicious URL. In an example, the features can include HTML head elements such that an HTML head element of the first HTML file can be compared with an HTML head element of the second HTML file and a similarity value can be calculated by measuring a string similarity between the HTML head element of the first HTML file and the HTML head element of the second HTML file based on a Levenshtein distance. Additionally or alternatively, the similarity value can be determined based on a number of tags contained within the HTML head element of the first HTML file and a number of tags contained within the HTML head element of the second HTML file. Those skilled in the art will appreciate that, additional features that can be used in connection with making the determination regarding whether the potentially malicious URL is a malicious URL. Non-limiting examples of such additional features include any or a combination of a logo, an icon, an image and the like associated with the HTML files.

In an aspect, when the similarity value resulting from the comparing meets a predetermined condition (e.g., is less than or greater than a predefined or configurable threshold (e.g., a distance threshold set by a cybersecurity expert)), then security service 102 can conclude that the first HTML file was created by a malicious actor and can respond the request with an indication that the potentially malicious URL is a malicious URL.

According to an alternative embodiment, security service 102 can analyze an entire website domain by retrieving various HTML files from a website domain of an enterprise and determining a similarity value for each HTML file by comparing features of each HTML file with corresponding features of a front-page HTML file such that when the similarity value of an HTML file is less than a predefined or configurable threshold, then security service 102 concludes that the website domain has potentially been compromised by a malicious actor, thereby, security service 102 alerts an administrator of the website domain regarding the HTML file.

As described above, the features can include any or a combination of an HTML head element, a logo, an icon, an image and the like associated with the HTML file and the corresponding features include any or a combination of an HTML head element, a logo, an icon, an image and the like associated with the front-page HTML file. In one example, security service 102 can calculate the similarity value by measuring a string similarity between the HTML head element of the HTML file and the HTML head element of the front-page HTML file based on a Levenshtein distance. In another example, security service 102 can determine the similarity value based on a number of tags contained within the HTML head element of the HTML file and a number of tags contained within the HTML head element of the front-page HTML file.

Figure 2:
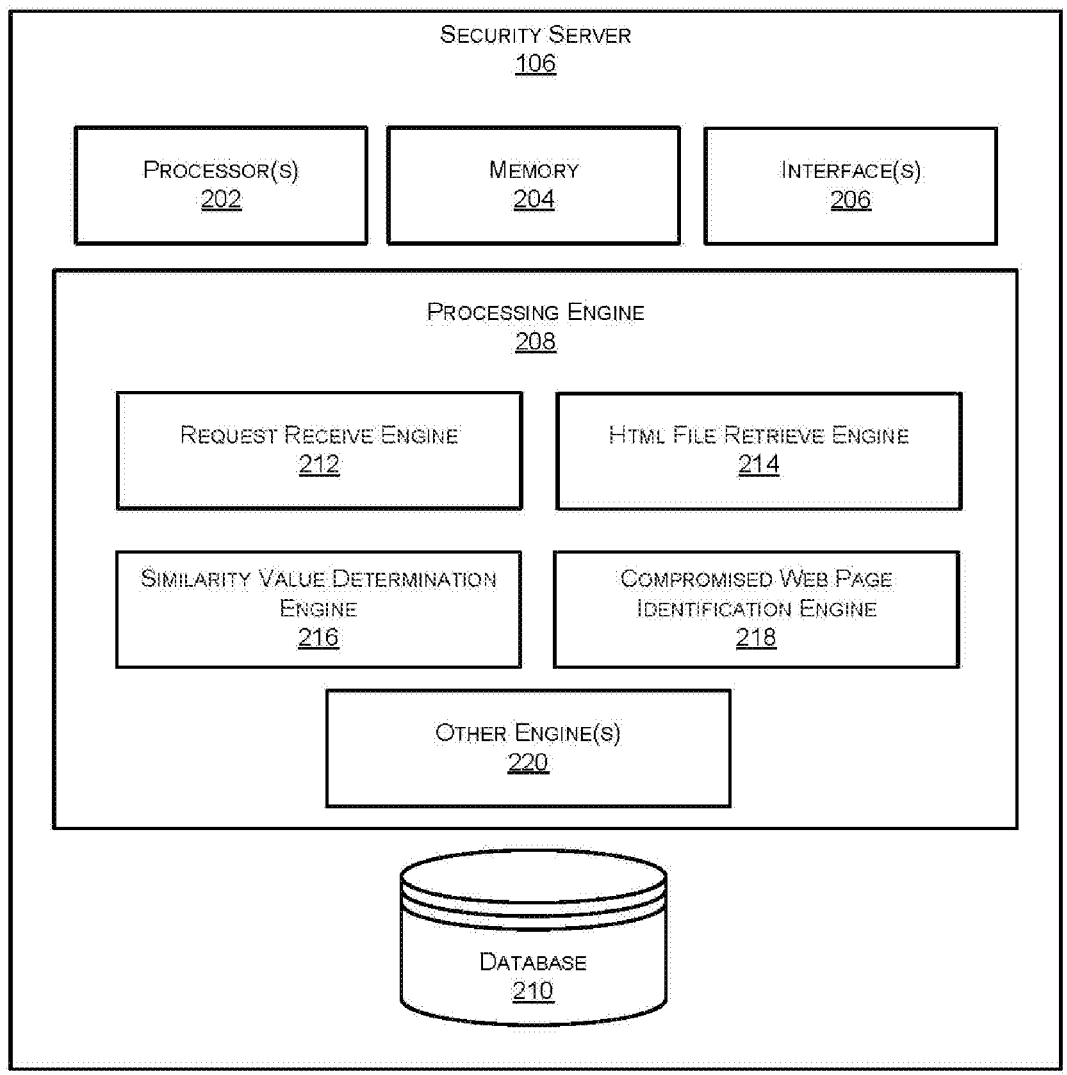
FIG. 2 illustrates exemplary functional components of a network security device in accordance with an embodiment of the present invention.

FIG. 2 illustrates exemplary functional components of a security server 106 in accordance with an embodiment of the present invention. As illustrated, security server 106 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of security server 106. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Security server 106 can also include one or more Interface(s) 206. Interface(s) 206 may include a variety of interfaces, for example, interfaces for data input and output devices, referred to as I/O devices, storage devices, and the like. Interface(s) 206 may facilitate communication of security server 106 with various devices coupled to security server 106. Interface(s) 206 may also provide a communication pathway for one or more components of security server 106. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, security server 106 can include the machine-readable storage medium storing the instructions and the processing resource to execute the instructions, or the machine-readable storage medium may be separate but accessible to security server 106 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a request receive engine 212, an HTML file retrieve engine 214, a similarity value determination engine 216, a compromised web page identification engine 218 and other engine(s) 220. Other engine(s) 220 can implement functionalities that supplement applications or functions performed by security server 106 or processing engine(s) 208.

According to a first approach, security server 102 can analyze a potentially malicious URL provided by an endpoint device, which can be initiated by request receive engine 212 by receiving a request that includes a potentially malicious URL pointing to a web page within a website domain of an enterprise from an endpoint device. In response to receipt of the request, HTML file retrieve engine 214 can retrieve a first HTML file and a second HTML file in which the first HTML file is the HTML file of the potentially malicious URL and the second HTML file is the HTML file of a host URL corresponding to the potentially malicious URL. Further, similarity value determination engine 216 can calculate a similarity value by comparing features of the first HTML file to corresponding features of the second HTML file to determine whether the potentially malicious URL is a malicious URL. When a similarity value resulting from the comparing is less than a predefined or configurable threshold, compromised web page identification engine 218 can conclude that the first HTML file was created by a malicious actor and thereby, compromised web page identification engine 218 can respond to the request with an indication that the potentially malicious URL is a malicious URL.

According to a second approach, security server 102 can analyze an entire website domain of an enterprise, which can be initiated by HTML file retrieve engine 214 by retrieving various HTML files from a website domain of an enterprise. Further, similarity value determination engine 216 can determine a similarity value for each of the HTML files by comparing features of each HTML file with corresponding features of a front-page HTML file. Further, when the similarity value of an HTML file selected from the various HTML files is less than a predefined or configurable threshold, then compromised web page identification engine 218 can conclude the website domain has potentially been compromised by a malicious actor. Further, compromised web page identification engine 218 can alert an administrator of the web site domain regarding the HTML file.

To provide clarity, working of similarity value determination engine 216 is explained using various implementations. In one implementation, similarity value determination engine 216 can take HTML <head> elements of first HTML file and the second HTML file as input. In another implementation, similarity value determination engine 216 can take HTML <head> elements of an HTML file and the front-page HTML file as input. Several methods can be used to calculate similarity between the two input <head> elements. For example, all tags within <head></head> and number of same tags between two input elements can be calculated to determine similarity value. Alternately, content within <head></head> of two input elements can be retrieved as strings so that the strings can be compared to determine similarity value based on leverage Levenshtein distance and calculation of edit distance between the strings. The Levenshtein distance operations can include removal, insertion, or substitution of a character in the string. For example, the Levenshtein distance of string a and string b is equal to the minimum number of operations required to transform a to b. The Levenshtein edit distance between $a=a_1 \ldots a_n$ and $b=b_1 \ldots b_m$ is given by $d_{mn}$, defined by the recurrence:

$$d_{i0} = i, \text{ for } 1 \leq i \leq m$$
$$d_{0j} = j, \text{ for } 1 \leq j \leq n$$
$$d_{ij} = \begin{cases} d_{i-1,j-1} & \text{for } a_j = b_i \\ \min(d_{i-1,j}, d_{i,j-1}, d_{i-1,j-1}) + 1 & \text{for } a_j \neq b_i \end{cases} \text{ for } 1 \leq i \leq m, 1 \leq j \leq n$$

Based on measuring a string similarity between two inputs, the similarity value can be calculated, which is used to determine malicious nature of the first HTML file or the website domain.

Figure 3:
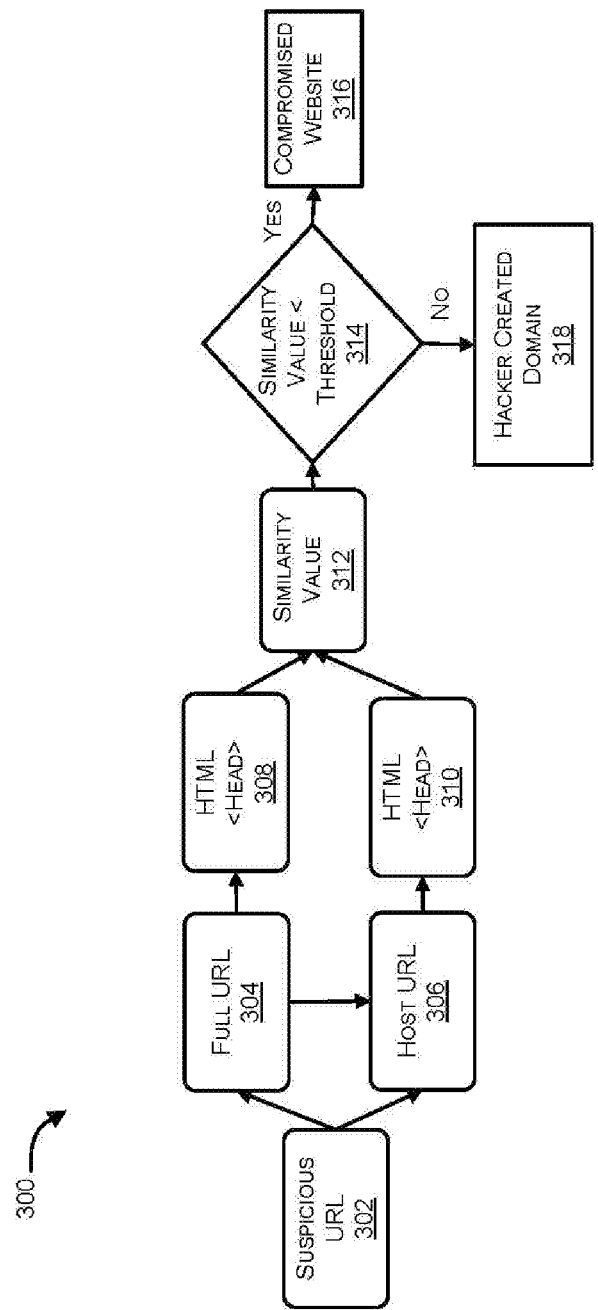
FIG. 3 is a block representation of an exemplary process for detecting compromised web sites.

FIG. 3 is a block representation 300 of an exemplary process for detecting compromised web sites.

In context of the present example, at block 302, a security service receives suspicious or potentially malicious URL. At blocks 304 and 308, the security service retrieves a first HTML file to which the suspicious URL points and extracts HTML <head> element (i.e. content between <head></head> tags) from the first HTML file. Similarly, at blocks 306 and 310, the security service extracts a second HTML file to which a host URL corresponding to the suspicious URL points and extracts HTML <head> element from the second HTML file. At block 312, the security service then calculates a similarity value by determining string similarity between head element of the first HTML file and head element of the second HTML file. If the similarity value is less than a predefined or configurable threshold (that is chosen by cyber-security expert), then, at block 316, the security service concludes that the first HTML file was created by a malicious actor. Otherwise, at block 318, the security service can determine whether the website domain is a part of hacker created domain.

FIG. 4A illustrates an exemplary representation 400 of a typical URL in accordance with an embodiment of the present disclosure. FIG. 4B illustrates an exemplary representation 420 of another URL in accordance with an embodiment of the present disclosure.

Those skilled in the art will appreciate that various parts of a URL can include a scheme, a hostname, a port, an origin, a path, a query, and a fragment. The scheme can be a protocol (e.g., http or https) used for retrieval. The hostname can be name or address of a web server to be accessed. The port can be a number used to identify a specific well-known port number, a registered port or a dynamic port, for example. When the port is omitted from the URL, a scheme specific default value can be used e.g. for http, the default is 80 and for https, the default is 443. The origin can be a unique combination of a scheme, hostname and port combined as scheme://hostname:port. The path can be portion of the URL from a slash (/) following the origin up to the query or fragment. When the path is omitted, the default path/can be used. The query can be portion of the URL from the first question mark (?) following the path up to the fragment. If the first question mark (?) in a URL appears after a hash (#), that section is not the query, but rather part of the fragment, therefore the fragment can be the portion of the URL from a hash (#) through the end.

In context of the above, example 400 represents that various parts of URL "http://search.abc.com:8080/history?era=darkages" includes scheme 402 as "http", hostname 404 as "search.abc.com", port 406 as "8080", origin 408 "http://search.abc.com:8080", path 410 "/history" and query 412 as "?era=darkages". Another example 420 represents that various parts of URL "http://search.abc.com:8080/history#?modern" includes scheme 422 as "http", hostname 424 as "search.abc.com", port 426 as "8080", origin 428 "http://search.abc.com:8080", path 430 as "/history" and fragment 432 as "#?modern".

Therefore, those skilled in the art will appreciate that given a potential malicious URL, the host URL can be obtained by excluding the path and query parts (portions) of the potential malicious URL.

FIG. 4C illustrates an exemplary representation 440 of a typical HTML file in accordance with an embodiment of the present disclosure.

As illustrated in representation 440, two main parts of an HTML file includes head and body. The head part of the HTML file includes information that is useful to the web browser and search engines but is not visible to the user e.g. title, keywords for search engines, scripts and the location of a cascading style sheet that is used in formatting of corresponding webpage. The body part of the HTML file defines main content of the HTML file or the section of the HTML file that will be directly visible on the web page.

FIG. 4D illustrates an exemplary representation 460 of an HTML file of a homepage of a website in accordance with an embodiment of the present invention. FIG. 4E illustrates an exemplary representation 480 of an HTML file of an original webpage of a website in accordance with an embodiment of the present invention. FIG. 4E illustrates an exemplary representation 490 of an HTML file of a malicious webpage added by a hacker of a website in accordance with an embodiment of the present invention.

Those skilled in the art will appreciate that various HTML page attributes or content may be used as the feature, including, but not limited to, a page logo, an icon, html head element, and the like. In one embodiment, the HTML <head> element is taken as the feature to determine compromised websites. The HTML <head> element is located between the <html> tag and the <body> tag and serves as a container for metadata that typically defines document title, character set, styles, links, scripts, and the like.

Referring to representations 460, 480 and 490, the HTML source codes of three web pages can be compared. On comparison, <head> elements of representations 460 and 480 can be determined to be substantially similar, while <head> element of representation 490 is substantially different from <head> elements of representations 460 and 480. Thus, such difference can be used to determine malicious web pages.

Figure 5A:
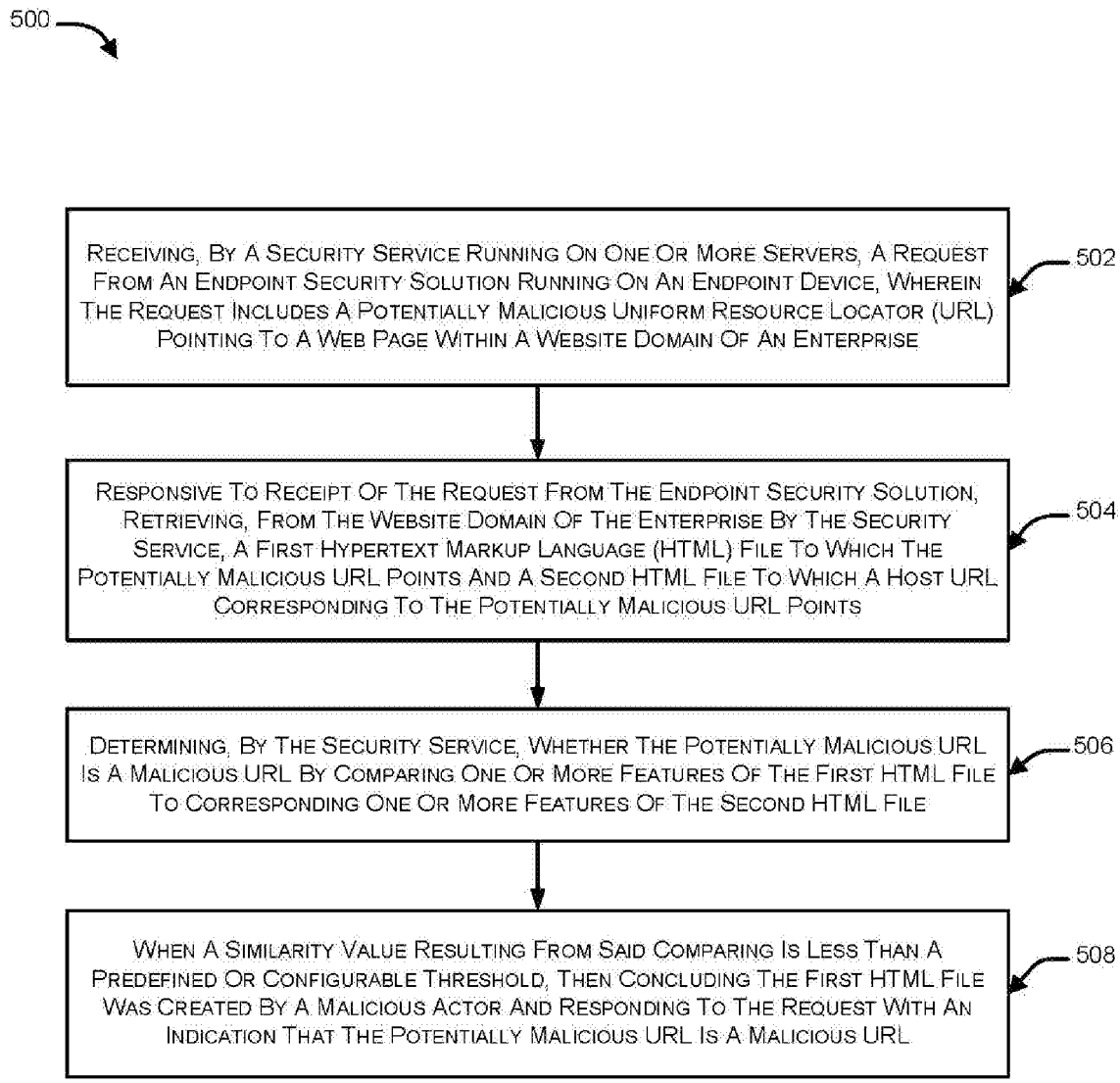
FIG. 5A is a flow diagram illustrating a process for detecting a compromised webpage in accordance with an embodiment of the present invention.

FIG. 5 is a flow diagram 500 illustrating a process for detecting a compromised web page in accordance with an embodiment of the present invention.

In the context of the present example, at block 502, a security service running on one or more servers receives a request from an endpoint security solution running on an endpoint device. The request can include a potentially malicious URL pointing to a web page within a website domain of an enterprise. In response to receipt of the request from the endpoint security solution, at block 504, the security service retrieves a first HTML file to which the potentially malicious URL points and a second HTML file to which a host URL corresponding to the potentially malicious URL points from the website domain of the enterprise. At block 506, the security service determines whether the potentially malicious URL is a malicious URL by comparing one or more features of the first HTML file to corresponding one or more features of the second HTML file. When a similarity value resulting from the comparing is less than a predefined or configurable threshold, then at block 508, the security service concludes that the first HTML file was created by a malicious actor and responds to the request with an indication that the potentially malicious URL is a malicious URL.

Figure 5B:
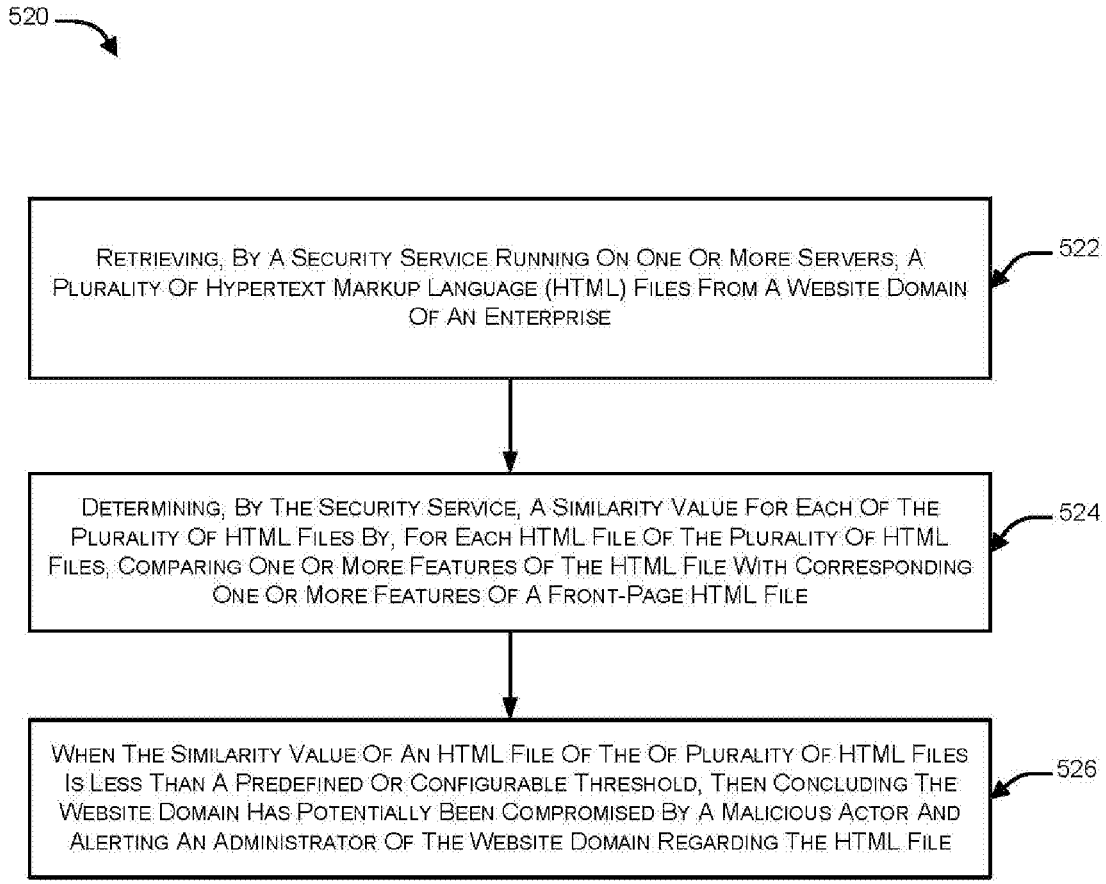
FIG. 5B is a flow diagram illustrating a process for detecting a compromised website domain in accordance with an alternative embodiment of the present invention.

FIG. 5B is a flow diagram 520 illustrating a process for detecting a compromised website domain in accordance with an embodiment of the present invention.

In context of the present example, at block 522, a security service running on one or more servers retrieves a plurality of HTML files from a website domain of an enterprise. At block 524, the security service determines a similarity value for each HTML of the plurality of HTML files by comparing one or more features of the HTML file with corresponding one or more features of a front-page HTML file such that when the similarity value of an HTML file of the of plurality of HTML files is less than a predefined or configurable threshold, then at block 526, the security service concludes that the website domain has potentially been compromised by a malicious actor and alerts an administrator of the website domain regarding the HTML file.

Figure 6:
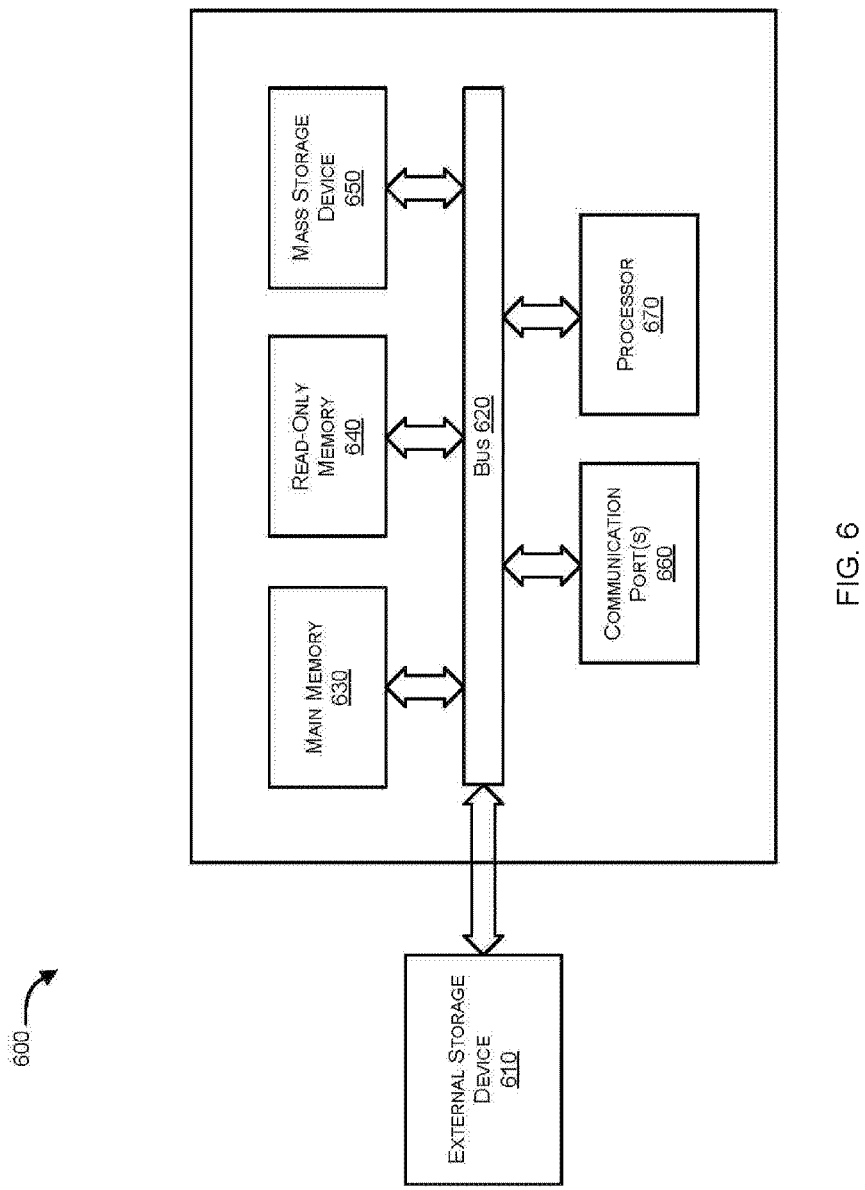
FIG. 6 illustrates an exemplary computer system in which or with which embodiments of the present invention may be utilized.

FIG. 6 illustrates an exemplary computer system 600 in which or with which embodiments of the present invention may be utilized.

As shown in FIG. 6, computer system includes an external storage device 610, a bus 620, a main memory 630, a read only memory 640, a mass storage device 650, a communication port 660, and a processor 670. Computer system may represent some portion of security service 102 or security server 106.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
receiving, by a security service running on one or more servers, a request from an endpoint security solution running on an endpoint device, wherein the request includes a potentially malicious uniform resource locator (URL) pointing to a web page within a website domain of an enterprise;
responsive to receipt of the request from the endpoint security solution, retrieving, from the website domain of the enterprise by the security service, a first hypertext markup language (HTML) file to which the potentially malicious URL points and a second HTML file to which a host URL corresponding to the potentially malicious URL points;
determining, by the security service, whether the potentially malicious URL is a malicious URL by comparing one or more features of the first HTML file to corresponding one or more features of the second HTML file; and
when a similarity value resulting from said comparing is less than a predefined or configurable threshold, then concluding the first HTML file was created by a malicious actor and responding to the request with an indication that the potentially malicious URL is a malicious URL.

2. The method of claim 1, wherein the one or more features include an HTML head element of the first HTML file and the corresponding one or more features include an HTML head element of the second HTML file.

3. The method of claim 2, wherein the one or more features further include any or a combination of a logo, an icon and an image associated with the first HTML file and the corresponding one or more features include any or a combination of a logo, an icon and an image associated with the second HTML file.

4. The method of claim 2, further comprising calculating, by the security service, the similarity value by measuring a string similarity between the HTML head element of the first HTML file and the HTML head element of the second HTML file.

5. The method of claim 4, wherein the string similarity is measured based on a Levenshtein distance.

6. The method of claim 2, wherein the similarity value is determined based on a number of tags contained within the HTML head element of the first HTML file and a number of tags contained within the HTML head element of the second HTML file.

7. The method of claim 1, wherein the security service identifies the domain as compromised when the request pertains to a suspicious URL and the at least one HTML file has the similarity value less than the pre-defined or configurable threshold.

8. A method comprising:
retrieving, by a security service running on one or more servers, a plurality of hypertext markup language (HTML) files from a website domain of an enterprise;
determining, by the security service, a similarity value for each of the plurality of HTML files by, for each HTML file of the plurality of HTML files, comparing one or more features of the HTML file with corresponding one or more features of a front-page HTML file, wherein the one or more features include an HTML head element of the HTML file and the corresponding one or more features include an HTML head element of the front-page HTML file, further comprising calculating, by the security service, the similarity value by measuring a string similarity between the HTML head element of the HTML file and the HTML head element of the front-page HTML file; and
when the similarity value of an HTML file of the of plurality of HTML files is less than a predefined or configurable threshold, then concluding the website domain has potentially been compromised by a malicious actor and alerting an administrator of the website domain regarding the HTML file.

9. The method of claim 8, wherein the one or more features further includes any or a combination of a logo, an icon and an image associated with the HTML file and the corresponding one or more features include any or a combination of a logo, an icon and an image associated with the front-page HTML file.

10. The method of claim 8, wherein the string similarity is measured based on a Levenshtein distance.

11. The method of claim 8, wherein the similarity value is determined based on a number of tags contained within the HTML head element of the HTML file and a number of tags contained within the HTML head element of the front-page HTML file.

12. A non-transitory computer-readable storage medium embodying a set of instructions, which when executed by one or more processors of a one or more servers, causes the one or more processors to perform a method comprising:
   receiving, by a security service running on the one or more servers, a request from an endpoint security solution running on an endpoint device, wherein the request includes a potentially malicious uniform resource locator (URL) pointing to a web page within a website domain of an enterprise;
   responsive to receipt of the request from the endpoint security solution, retrieving, from the website domain of the enterprise by the security service, a first hypertext markup language (HTML) file to which the potentially malicious URL points and a second HTML file to which a host URL corresponding to the potentially malicious URL points;
   determining, by the security service, whether the potentially malicious URL is a malicious URL by comparing one or more features of the first HTML file to corresponding one or more features of the second HTML file; and
   when a similarity value resulting from said comparing is less than a predefined or configurable threshold, then concluding the first HTML file was created by a malicious actor and responding to the request with an indication that the potentially malicious URL is a malicious URL.

13. The non-transitory computer-readable storage medium of claim 12, wherein the one or more features include an HTML head element of the first HTML file and the corresponding one or more features include an HTML head element of the second HTML file.

14. The non-transitory computer-readable storage medium of claim 13, wherein the one or more features further include any or a combination of a logo, an icon and an image associated with the first HTML file and the corresponding one or more features include any or a combination of a logo, an icon and an image associated with the second HTML file.

15. The non-transitory computer-readable storage medium of claim 13, further comprising calculating, by the security service, the similarity value by measuring a string similarity between the HTML head element of the first HTML file and the HTML head element of the second HTML file.

16. The non-transitory computer-readable storage medium of claim 15, wherein the string similarity is measured based on a Levenshtein distance.

17. The non-transitory computer-readable storage medium of claim 13, wherein the similarity value is determined based on a number of tags contained within the HTML head element of the first HTML file and a number of tags contained within the HTML head element of the second HTML file.

18. A non-transitory computer-readable storage medium embodying a set of instructions, which when executed by one or more processors of a one or more servers, causes the one or more processors to perform a method comprising:
   retrieving, by a security service running on the one or more servers, a plurality of hypertext markup language (HTML) files from a website domain of an enterprise;
   determining, by the security service, a similarity value for each of the plurality of HTML files by, for each HTML file of the plurality of HTML files, comparing one or more features of the HTML file with corresponding one or more features of a front-page HTML file, wherein the one or more features include an HTML head element of the HTML file and the corresponding one or more features include an HTML head element of the front-page HTML file, further comprising calculating, by the security service, the similarity value by measuring a string similarity between the HTML head element of the HTML file and the HTML head element of the front-page HTML file; and
   when the similarity value of an HTML file of the of plurality of HTML files is less than a predefined or configurable threshold, then concluding the website domain has potentially been compromised by a malicious actor and alerting an administrator of the website domain regarding the HTML file.

\* \* \* \* \*